United States Patent
Swix et al.

(10) Patent No.: US 6,609,253 B1
(45) Date of Patent: Aug. 19, 2003

(54) METHOD AND SYSTEM FOR PROVIDING INTERACTIVE MEDIA VCR CONTROL

(75) Inventors: Scott R. Swix, Duluth, GA (US); John R. Stefanik, Atlanta, GA (US); John C. Batten, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/475,193

(22) Filed: Dec. 30, 1999

(Under 37 CFR 1.47)

(51) Int. Cl.⁷ .............................................. H04N 7/173
(52) U.S. Cl. ............................ 725/88; 725/102; 386/83
(58) Field of Search .............................. 386/83; 725/87, 725/88, 89, 90, 101, 102, 93, 95; H04N 7/173

(56) References Cited

U.S. PATENT DOCUMENTS

| | | | | |
|---|---|---|---|---|
| 3,597,692 A | * | 8/1971 | Fannoy .......................... | 725/87 |
| 5,357,276 A | | 10/1994 | Banker et al. | |
| 5,682,599 A | * | 10/1997 | Yoshinobu ................... | 725/134 |
| 5,969,714 A | | 10/1999 | Butcher | |
| 6,072,982 A | * | 6/2000 | Haddad ......................... | 725/91 |
| 6,305,019 B1 | * | 10/2001 | Dyer et al. .................... | 725/91 |
| 6,493,876 B1 | * | 12/2002 | DeFreese et al. ........... | 725/100 |

* cited by examiner

Primary Examiner—Vincent Boccio
Assistant Examiner—James A Fletcher
(74) Attorney, Agent, or Firm—Shaw Pittman LLP

(57) ABSTRACT

A method and system for providing flexible subscriber VCR control of an interactive media system that limits the consumption of bandwidth capacity, the method comprising establishing a viewing time window during which a subscriber can watch an ordered program, enabling the subscriber to freely pause, rewind, and fast-forward the program so long as the end of the program does not exceed the end of the window, automatically tracking the remaining program running time against the time remaining in the window, deactivating the pause and rewind features if the remaining program running time equals the time remaining in the window, and reactivating the pause and rewind features if the program is fast-forwarded such that the time remaining in the window exceeds the remaining program running time. The system of the present invention is any interactive media system that delivers video streams such as an interactive television system that supports services such as pay-per-view and video-on-demand, or an internet-based interactive media system that downloads video streams through the internet to be played on a subscriber's personal computer or other viewing device.

24 Claims, 3 Drawing Sheets

|   | VT$_E$ Elapsed Viewing Time (180 min total) | VT$_R$ Remaining Viewing Time | TS Time Stamp (120 min total) | PT$_R$ Remaining Program Time | GP Grace Period |
|---|---|---|---|---|---|
| 1. Start | 0 | 180 | 0 | 120 | 60 |
| 2. Play 30 min. | 0-30 | 150 | 0-30 | 90 | 60 |
| 3. Pause 30 min. | 30-60 | 120 | 30 | 90 | 30 |
| 4. Play 30 min | 60-90 | 90 | 30-60 | 60 | 30 |
| 5. Rewind 3 min. | 90-93 | 87 | 60-36 | 84 | 3 |
| 6. Play 3 min. | 93-96 | 84 | 36-39 | 81 | 3 |
| 7. Pause 3 min. | 96-99 | 81 | 39 | 81 | 0 |
| 8. Fast Forward 2 min. | 99-101 | 79 | 39-55 | 65 | 14 |
| 9. Play 65 min. | 101-166 | 14 | 55-120 | 0 Complete | 14 |

Figure 3

METHOD AND SYSTEM FOR PROVIDING INTERACTIVE MEDIA VCR CONTROL

BACKGROUND

1. Field of the Invention

The present invention relates to the field of interactive media systems, and more particularly, to a method and system for providing video cassette recorder (VCR) control of an interactive media system.

2. Background of the Invention

Interactive media system providers (referred to herein as service providers) have long been offering services that permit subscribers to purchase movies or special events for in-home viewing. These services enable a subscriber to browse a library of live and pre-recorded programs, to order a program, and to watch that program on the subscriber's home viewing equipment. Typical variations of these services include pay-per-view, near video-on-demand (NVOD), and video-on-demand (VOD). Pay-per-view services usually offer live broadcast events that are shown only once, such as Wrestlemania™ or boxing events. Near-video-on-demand services typically deploy continuous video streams at regular intervals, e.g., the same movie is shown for a whole day starting every fifteen minutes. Finally, video-on-demand services typically deliver individual media streams to subscribers immediately upon ordering. Overall, subscribers greatly value these services for their convenience in avoiding such difficulties as traveling to rent and return a video cassette or digital video disc (DVD) from a retail vendor.

Although some of these services deliver live event broadcasts or continuous media streams to multiple subscribers, the present invention is directed to the typical video-on-demand service, in which a pre-recorded program is delivered through an individual media stream to an individual subscriber. In such a case, the program is digitally encoded, stored on a server, and transmitted to a subscriber upon ordering.

To further attract subscribers to these interactive media services, service providers have added viewing functions that emulate the operation of a video cassette recorder (VCR). U.S. Pat. No. 5,357,276 to Banker, et al. discloses one such method of providing video-on-demand with VCR-like functions. Examples of these VCR functions include pause, rewind, and fast-forward. In this manner, subscribers can order a program and not be constrained by a continuous, unstoppable showing. Instead, the enhanced service gives the subscribers control over the delivery of the program and increased viewing flexibility. For example, with VCR-like functions, a subscriber can pause the viewing of an ordered program to accommodate such interruptions as telephone calls or trips to bathroom. In addition, using the rewinding function, a subscriber can return to and replay a favorite movie scene or perhaps return to a critical point in a program to ascertain missed information. Thus, subscribers have come to appreciate interactive media services with VCR-like control and will pay a premium to use them.

As used herein, "VCR-like control" and "VCR control" are synonymous terms describing the simulated video cassette recorder control that is applied to interactive media services. Likewise, "VCR function" refers to a simulated video cassette recorder function, such as pause.

Although giving subscribers more viewing control increases subscribership and revenues, the added control presents a significant bandwidth problem for the service providers. Specifically, with unlimited VCR control, a subscriber can continuously use available bandwidth by, for example, watching a program or a portion of a program several times using the rewind function. Or, a subscriber might activate the pause feature for an extended amount of time and return to the program hours or days later. In effect, a subscriber with unlimited VCR control can consume the bandwidth allotted to his program for an indefinite amount of time. Further, for every subscriber tying up a portion of bandwidth, the capacity of the video server providing the service is reduced, resulting in, at some point, the service provider's inability to sell another program to another subscriber.

To offset this bandwidth consumption, one method of limiting VCR control invokes a "time out" function that terminates a subscriber's ability to play the program. Typically, service providers have experimented with weekly or daily purchases, where a subscriber can view the program and use the VCR control without restriction during the allotted time period. However, service providers still find subscribers exploiting the service by watching a program repeatedly and consuming the allotted bandwidth for nearly the whole purchase period. Although the service providers can compensate for this repeated viewing by charging more for the service, subscribers tend to forego the service as cost increases.

To further limit the VCR control, service providers sometimes reduce purchase periods from weekly or daily durations to durations of a few hours. This time limit restricts the number of times a subscriber can rewind and replay a program, and simplifies the tasks of allocating bandwidth and opening capacity to other subscribers. However, timing out after just a few hours greatly reduces viewing flexibility and frustrates subscribers. As an example of this inflexible time out feature, a subscriber given five hours to watch a two hour movie might unexpectedly have to pause the program to take an important and lengthy telephone call. Even upon returning to the program within the five hours, the subscriber may not have enough time to watch the end of the movie because the remaining duration of the movie exceeds the time remaining before the time out. The result in these prior art time out systems is the termination of the movie, without warning and regardless of whether the subscriber reached the end of the movie. In addition, this time out method imposes a fixed viewing period that fails to factor in the length of a particular ordered program. Thus, a subscriber may think he has the same grace period for a longer program as for a shorter program, only to be cut off at the end of the viewing period.

Instead of timing out, some service providers base a completed program purchase on whether the subscriber views the end of the program. For example, the service provider can deactivate the VCR control once the subscriber reaches a certain point toward the end of the program, such as the rolling of credits. However, clever subscribers aware of the threshold point can still rewind, pause, and replay as often as they like and consume bandwidth to the detriment of the service provider. In addition, determining the point in a program at which to deactivate the VCR control is a tricky exercise, which can result in service behavior that annoys some subscribers but not others. For example, some subscribers may want the ability to rewind during the credits to catch an actor's name while others simply turn off the program when credits begin.

Rather than limiting viewing time, some service providers restrict the total time that the VCR control can be applied.

For example, a service provider may limit a subscriber to pressing the pause, rewind, or fast-forward functions for a total of 10 minutes. Pressing pause for 10 minutes is straightforward and is not problematic. However, in typical interactive media systems with VCR control, pressing rewind or fast-forward a certain amount of time shifts the viewing time a proportionally longer amount of time, e.g., in a system in which rewind and fast-forward speeds are 8 times faster than the viewing time speed, pushing the rewind or fast-forward button for 10 minutes backs up or advances the real time running of the program 80 minutes. Thus, following this example, for a movie or program shorter than 80 minutes, the subscriber could essentially rewind the whole program and watch it again, increasing the bandwidth consumption up to 80 minutes.

As another disadvantage, the interactive media systems that limit the duration of VCR control fail to credit a subscriber for pressing fast-forward and for actually reducing the bandwidth consumption. For instance, with VCR control limited to 10 minutes, if the subscriber pressed the fast-forward button for 10 minutes to check the name of an actor in the credits appearing 80 minutes later in the running time of the program, the subscriber would consume all 10 minutes of the VCR control. Further, because the interactive media systems that limit VCR control fail to recognize that pressing fast-forward reduces bandwidth and fail to credit the subscriber with the reduced bandwidth, the subscriber would have no more (credited) time for VCR control and would be unable to rewind to the original program location. (If the subscriber were to rewind to the original program location, the net change in bandwidth consumption would only be the sum of the 10 minutes it took to press fast-forward, the minute or so it took to read the credits, and the approximately 10 minutes it took to return to the original program location.)

Similarly, these interactive media systems fail to allow a subscriber to freely rewind and fast-forward to review prior segments and return to previous viewing locations. For instance, with VCR control limited to 10 minutes, if a subscriber backed up 80 minutes in a program to replay a favorite scene, the subscriber could not fast-forward to the previous viewing time to resume watching the rest of the program. Instead, after backing up 80 minutes and using 10 minutes of rewind/pause/fast-forward time, the subscriber would have to wait 80 minutes of real-time viewing to return to the location from which the subscriber began rewinding.

Alternatively, instead of limiting the amount of time a subscriber can rewind or fast-forward, a service provider can limit the amount of time traversed in the program's running time. For instance, the service provider would limit the amount of time traversed in the program's running time to 10 minutes, rather than limiting the pause/rewind/fast-forward time to 10 minutes. However, based on the 1:8 ratio, this limit would leave the subscriber with only 1.25 minutes of VCR control-hardly enough to satisfy subscribers and encourage interactive media purchases.

SUMMARY OF THE INVENTION

The present invention is a system and method for providing flexible subscriber control of an interactive media without unnecessarily consuming bandwidth capacity. Broadly stated, the present invention establishes a viewing time window in which a subscriber can watch an ordered program, enables the subscriber to freely pause, rewind, and fast-forward the program so long as the end of the program does not exceed the end of the window, automatically tracks the remaining program running time against the time remaining in the window, deactivates the pause and rewind features if the remaining program running time equals the time remaining in the window, and reactivates the pause and rewind features if the program is fast-forwarded such that the time remaining in the window exceeds the remaining program running time. The present invention provides subscribers with VCR control of interactive media programs, yet reasonably limits that control to conserve the bandwidth resources of service providers. Thus, subscribers receive a quality media delivery service that fulfills their requirement for VCR functionality, while the service providers conserve system resources, enlist more subscribers, and maximize profits.

The present invention can be implemented in any interactive media system that delivers video streams. Generally, the interactive media system will have a data storage device of finite capacity, e.g., a video server, that stores video data and delivers that video data in video streams. Preferably, the video streams are prerecorded programs. Also, preferably, the interactive media system is an interactive television system that supports services such as pay-per-view and video-on-demand. However, in another preferred embodiment of the present invention, the interactive media system is an internet-based interactive media system, in which video streams are downloaded through the internet and played at a subscriber's personal computer or other viewing device.

The present invention establishes the length of the viewing time window based on a selected multiple of the program running time, preferably between roughly 1.5 and 2. For example, with a multiplier of 1.5, if a movie's running time is 2 hours, the viewing time window is 1.5×2 hours, or 3 hours. During these 3 hours, the subscriber may pause, rewind, or fast-forward, subject to the limitation that the movie must end within the 3 hour viewing time window. Using a multiplier carries the advantage of accounting for the length of the program instead of imposing inflexible cut-off times like those of the prior art. Thus, a subscriber has a proportionally equal grace period for both short and long programs and is not short-changed on VCR control when ordering long programs. In addition, different multipliers could be applied to programs of different lengths, e.g., a long 4 hour movie could have a multiplier of 2, while a short 1-½ hour movie could have a multiplier of 1.5.

In the preferred embodiment of the present invention, the service provider determines the appropriate multiplier based on such factors as the capacity of the video server, the projected subscriber use of the service, the running times of available programs, and the minimum acceptable VCR control time, perhaps based on consumer satisfaction surveys. The appropriate multiplier varies among different service providers and different interactive media systems. However, this feature of the present invention is easily modified to accommodate the system requirements of each service provider and to accommodate the changing usage patterns of an individual system.

Once an appropriate multiplier is determined, the present invention continually tracks the remaining movie running time against the time remaining in the viewing time window, automatically prevents the subscriber from exceeding the end of the viewing time window, and reports the status of the running time and viewing window time to the subscriber. In a preferred embodiment of the present invention, during the showing of an ordered program, as a subscriber pauses, rewinds, and fast-forwards, the present invention calculates the time remaining in the viewing time window by subtracting the elapsed viewing time from the total viewing time window and calculates the remaining movie running time using either an end time method or a time stamp method.

The end time method instantaneously calculates the effects of the VCR control actions on the end time of the movie. For pausing, the present invention simply adds the duration that the pause is activated to the previous end time of the program. For rewinding, the present invention adds the amount of program time rewound plus the duration that the rewind function is activated to the previous program end time. For fast-forwarding, the present invention subtracts the amount of program time forwarded, minus the duration that the fast-forward function is activated, from the previous program end time. For interactive media systems that do not provide program time stamps, the end time method is the preferred method for calculating the remaining movie running time.

As an alternative to the end time method, the time stamp method calculates the remaining movie running time by subtracting the time stamp of the program video stream from the total program duration. For interactive media systems that do provide program time stamps, the time stamp method is the preferred method for calculating the remaining movie running time.

To prevent the program from ending beyond the viewing time window and the subscriber's missing the program end, the present invention deactivates certain VCR functions. Thus, when the calculations described above show that the program end time equals the end of the viewing time window, the present invention deactivates the pause and rewind functions (because these functions extend the program end time). However, the present invention still provides the fast-forward function and, if activated, tracks its effects on the program end time. In this manner, the present invention recognizes that the subscriber has shortened the duration of the remaining program time (and reduced bandwidth consumption) such that the program end time is before the end of the viewing time window. As a result, the present invention reactivates the pause and rewind functions to give the subscriber the opportunity to again use the entire viewing time window.

In addition to pause, rewind, and fast-forward, the present invention also supports a stop function and a scene jump function. The stop function performs identically to the pause function, except that the screen is blanked instead of frozen. In conjunction with the stop function, the present invention could also allow a subscriber to start the movie over if enough time remained in the viewing time window (which would essentially be identical to the rewind function). The scene jump function would provide a menu of scenes from which to choose, similar to digital video disc formats. After a scene is chosen, the present invention would jump to that scene and play it. The scene jump function would operate similarly to the rewind and fast-forward functions, except that the amount of time the subscriber views the menu would be added to the program end time, as if the subscriber pressed pause while viewing the menu.

Thus, the interactive media VCR control of the present invention limits a subscriber's ability to consume bandwidth capacity yet provides a satisfactory viewing experience. The method and system for providing this VCR control confines the bandwidth consumption to within a maximum value to enable a service provider to properly allocate video server resources. The VCR control supports the traditional VCR functions such as pause, rewind, and fast-forward, but limits their use to conserve bandwidth capacity, and monitors their use and advises the subscriber of any corresponding viewing limits. Finally, the system and method monitors a subscriber's use of the VCR control and automatically deactivates or activates the control as necessary to complete the showing of a program within a purchase period.

Accordingly, it is an object of the present invention to provide a system and method for providing interactive media VCR control that limits a subscriber's ability to consume bandwidth capacity yet provides a satisfactory viewing experience.

It is another object of the present invention to provide interactive media VCR control that confines bandwidth consumption to within a maximum value to enable a service provider to properly allocate video server resources.

It is another object of the present invention to limit a subscriber's viewing control of a program, while still permitting enough flexibility to satisfy the subscriber's preference for VCR control.

It is another object of the present invention to provide interactive media VCR control that supports traditional VCR functions such as pause, rewind, and fast-forward, but limits their use to conserve bandwidth capacity, and monitors their use and advises the subscriber of any corresponding viewing limits.

It is another object of the present invention to provide a system and method that monitors a subscriber's use of VCR control and automatically deactivates or activates VCR functions as necessary to complete the showing of a program within a purchase period.

These and other objects of the present invention are described in greater detail in the detailed description of the invention, the appended drawings, and the attached claims. Additional features and advantages of the invention will be set forth in the description that follows, will be apparent from the description, or may be learned by practicing the invention.

DESCRIPTION OF THE DRAWINGS

FIG. 3 is a table listing the viewing time, program time, and grace period values for each time bar shown in FIG. 2.

DETAILED DESCRIPTION OF THE INVENTION

Figure 1:
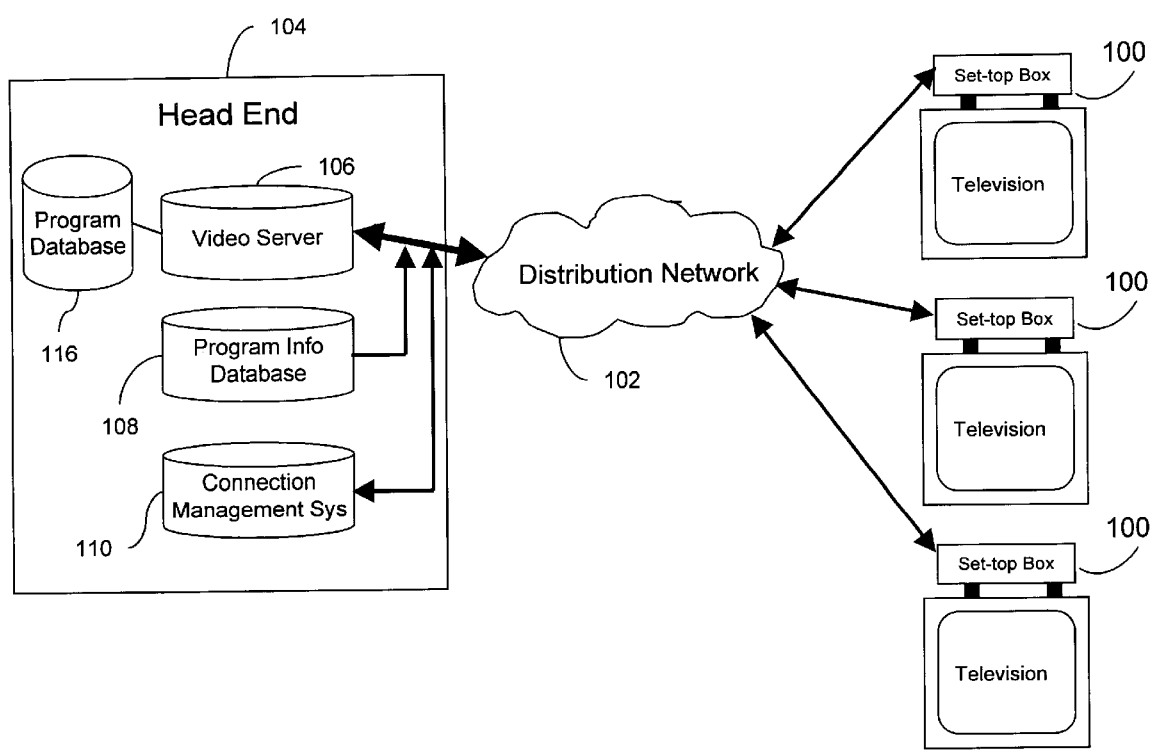
FIG. 1 is a schematic diagram of the system architecture of the present invention.

The present invention is a system and method for providing an interactive media system with VCR control that limits a subscriber's bandwidth consumption yet provides a satisfactory viewing experience akin to home video viewing. The present invention enhances any interactive media delivery system, including, for example, conventional cable television networks, wireless cable television networks, home satellite television networks, internet-based video stream delivery systems, hard disk download systems (in which a program is downloaded and viewed from a local hard disk for a limited amount of time—e.g., TiVo™ interactive television systems), "dumb terminal" systems (in which a head end possesses the intelligence and a device, such as a set-top box, passes key stroke information to the head end), and other media delivery systems that allow duplex communication (perhaps with the return path via a separate, e.g., telephone, network) to a set-top box coupled to a subscriber's display device, such as a television. Preferably, as shown in FIG. 1, the interactive media delivery system comprises a plurality of set-top boxes 100 connected through a distribution network 102 to a head end 104. Also, preferably, head end 104 includes a video server 106, a program information database 108, a connection management system 110, and a program database 116.

As an overview of the method of the present invention, the present invention establishes a viewing time window during which to watch the program, provides VCR control during that viewing time window, continually tracks the time remaining in the viewing time window against the remaining program time, and deactivates and reactivates VCR functions depending on whether the time remaining in the viewing time window exceeds the remaining program time. With this method, the present invention provides the subscriber with VCR control of a program while fixing a maximum bandwidth consumption so that the service provider can properly allocate system resources.

The following description of a system architecture and a method for implementing within that architecture are examples of preferred embodiments of the present invention. Although the present invention is applicable to a variety of services in which networked media delivery systems deliver purchased programs to subscribers, the following description and schematics trace the operation of the present invention in the context of a video-on-demand system. While the method described herein and illustrated in the figures contains many specific examples of media flow steps, these steps should not be construed as limitations on the scope of the invention, but rather as examples of media flow steps that could be used to practice the invention. As would be apparent to one of ordinary skill in the art, many other variations on the system operation are possible, including differently grouped and ordered method steps. Accordingly, the scope of the invention should be determined not by the embodiments illustrated, but by the appended claims and their equivalents.

System Architecture

Referring to FIG. 1, head end 104, which is typically operated by a media service provider, communicates with the plurality of set-top boxes 100 through distribution network 102. Distribution network 102 is any media delivery network, such as a coaxial or fiberoptic cable system. Within head end 104, video server 106, program information database 108, connection management system 110, and program database 116 provide the functions and information resources embodied in head end 104.

Video server 106 receives from the plurality of set-top boxes 100 subscriber viewing selections, retrieves programs from program database 116 based on the viewing selections, transmits a particular selected program on a particular channel or stream to a particular set-top box, and instructs the particular set-top box to tune to the particular channel or select the particular stream. Video server 106 is in communication with program database 116, which stores and downloads video data files. Alternatively, video server 106 and program database 116 could be combined into a single component. The video data can be in any form compatible with the networked media delivery system, e.g., digitally encoded MPEG files. The content of the video data can be any media program, e.g., advertisements, television shows, news, movie trailers, movies, or sporting events.

Program information database 108 supplies program data such as title, actors, duration (running time), and perhaps the multiplier for the program (or for the interactive media system, if all programs use the same multiplier). Program information database 108 provides the plurality of set-top boxes 100 with some ordinary information, e.g., information about actors and directors, that is simply displayed to a subscriber during the ordering process. In addition, program information database 108 provides the plurality of set-top boxes 100 with the program duration and multiplier information that is critical to the present invention, as it is required to calculate the viewing time window, and to calculate and track the remaining viewing time and remaining program time. Optionally, instead of having program information database 108 deliver the multiplier to the plurality of set-top boxes 100, the multiplier could be hard-coded into the set-top box software.

Connection management system 110 is a packet switch device, a conditional access type device, or a combination of a packet switch device and a conditional access type device. Connection management system 110 establishes, monitors, and tears down client-server communications, including connecting individual set-top boxes through particular channels to head end 104. Generally, connection management system 110 assigns a video stream to a channel or other address and informs the subscriber's set-top box of the channel or address on which the program is running. Connection management system 110 also activates or deactivates streams on the video server and manages the connection and messaging, e.g., TCP/IP, between the plurality of set-top boxes 100 and head end 104. In addition, connection management system 110 monitors the connection between a set-top box and video server 106 and shuts down a stream from video server 106 if the connection is lost for an extended period, e.g., if the set-top box loses power. Finally, connection management system 110 also executes the absolute shutting down of the video server stream when a subscriber reaches the end of the viewing time window.

The plurality set-top boxes 100 resides at subscribers' premises, in communication with the subscribers' viewing devices, e.g., televisions. A set-top box is a network media device comprising a microprocessor, a memory buffer for operating instructions and storage, and a control interface for receiving subscriber viewing commands from a remote control device or control panel. In addition to the term "set-top box," such a network media device is sometimes referred to as a set-top terminal, a cable converter, or a home communications terminal. One or more of these terms apply generally to processing devices that are coupled to or made a part of a display device that shows programming to a subscriber. When it is connected to a viewing device, e.g., a television set at a subscriber premises, the set-top box responds to the viewing selections of a subscriber and communicates with head end 104.

Each set-top box of the plurality of set-top boxes 100 provides a control interface through which a subscriber makes viewing selections, e.g., using a remote control unit or a control panel. In providing this interface, a set-top box performs the following functions: (1) routes traditional broadcast signals to the connected viewing device; (2) converts media content to a selected video format (e.g., NTSC or PAL) and presents the content to the subscriber; (3) for interactive systems, exchanges messages (including video data) with head end 104 over distribution network 102; (4) receives messages from a subscriber input device, such as a remote control unit or a control panel; (5) translates video signals from a network-native format into a format that can be used by the viewing device; (6) inserts alphanumeric or graphical information into the video stream to overlay that information on the video image; and (7) provides graphic or audio feedback to the subscriber. Examples of commercially available set-top boxes that satisfy these functions include an SA Explorer 2000 set-top box by Scientific Atlanta, a DCT-5000 set-top box by General Instruments, and a Z12C set-top box by Zenith.

With specific reference to the present invention, each set-top box completes many intelligent functions, including the receiving, storage, exchange, and display of data. To satisfy these functions, the set-top box has a navigator, an operating system, and memory storage, e.g., read-only memory (ROM), and random access memory (RAM). The operating system is a computer program that, after being initially loaded into the set-top box by a bootstrap program, manages the other programs, or applications, running on the set-top box. The navigator is a software application running on top of the operating system. The navigator generates menu screens and accepts viewer menu selections such as movie orders, preview orders, or requests to watch an advertisement. Based on these selections, the navigator directs the video server to deliver the selected program, e.g., the server plays the selected movie. In addition, the navigator receives pertinent data from head end 104, e.g., movie duration, and continually executes the algorithm that tracks the viewing time window against the ending time of a program. Optionally, the operating system and navigator could be combined into a single software application that executes all of their functions. The memory storage holds permanent programs required to boot-up the set-top box or to execute other functions (e.g., ROM) and holds temporary information downloaded from the head end 104 (e.g., RAM or hard disk drive).

System Operation

Operating together, the above-described components provide interactive media VCR control. Once a subscriber has ordered a program through a set-top box 100, connection management system 110 of head end 104 retrieves the ordered program from program database 116 and specifies a channel through which video server 106 is to transmit the program to the set-top box. Connection management system 110 establishes the specified channel and manages the messaging and connection (e.g., TCP/IP) between the set-top box and video server 106. At the same time, video server 106 instructs the navigator of the subscriber's set-top box to tune to the specified channel. Also, program information database 108 downloads the program duration to the navigator. The navigator can now monitor the time remaining in the viewing time window against the time remaining in the program because it has the channel identification and program duration. Optionally, the navigator could reside in head end 104, in which case a set-top box would merely send the pause, rewind, and fast-forward key presses to head end 104, and the navigator at head end 104 would take the appropriate actions.

As video server 106 transmits the program through the specified channel, the subscriber may initiate VCR control via a remote control unit or other control panel in communication with the set-top box. When the set-top box receives a VCR command, e.g., pause, rewind, or fast-forward, the set-top box relays the command to video server 106. Video server 106 then shuttles the video data in accordance with the subscriber's VCR command.

While the set-top box is receiving a VCR command from the subscriber, the navigator is continually and instantaneously calculating the time remaining in the viewing time window and the remaining duration of the program. In this manner, when the remaining viewing time equals the remaining program time, the set-top box deactivates the pause and rewind functions, i.e., it no longer relays these commands to video server 106. If the subscriber subsequently fast-forwards the program, the navigator runs the calculations again, recognizes that the time remaining in the viewing time window exceeds the remaining program time, and reactivates the pause and rewind VCR functions. This calculation-deactivation-reactivation process continues until there is no time remaining in the viewing time window and the program has reached its end. Once the program is complete, connection management system 110 tears down the channel between video server 106 and the set-top box to free the system resources for other purchased programs.

To track whether VCR functions can be activated, the present invention continually tracks the remaining program running time against the time remaining in the viewing time window. To calculate the time remaining in the viewing time window, the elapsed viewing time is subtracted from the total viewing time window. The remaining program running time is calculated using either an end time method or a time stamp method. The end time method is preferred for interactive media systems that do not provide program time stamps while the time stamp method is preferred for those systems that do provide program time stamps. Further, the time stamp method provides advantages over the end time method in the following circumstances: 1) when an interactive media system does not provide a consistent ratio of rewind/fast-forward time to viewing time because of, for example, variations in the digital encoding of a program (e.g., in one part of a movie the ratio may be 8:1, but in another part the ratio may be 4:1, therefore complicating a calculation of the shift in program time during activation of VCR control), and 2) when an interactive media system possesses latencies or other problems that prevent an accurate calculation of the shift in program time during activation of VCR control.

For the end time method, the present invention instantaneously calculates the effects of the VCR control actions on the end time of the program by executing a particular formula for each action. For pausing, the new end time equals the previous program end time of the program plus the duration that the pause is activated. For rewinding, the new end time equals the previous program end time plus the amount of program time rewound plus the duration that the rewind function is activated. For fast-forwarding, the new end time equals the previous program end time minus the amount of program time forwarded, plus the duration that the fast-forward function is activated.

For the time stamp method, the navigator of the set-top box uses an algorithm based on the program duration (PD) provided by program information database 108, a multiplier (M) of the program duration that establishes the viewing time window (the multiplier could be (i) provided to the set-top box by head end 104, or (ii) hard coded on the set-top box software), and a time stamp (TS) that marks the time location in a program starting from the beginning of the program (the time stamp is delivered with the video data stream of the program). Thus, during the showing of a program, the navigator continually executes the following algorithm, where VTW is viewing time window, $VT_E$ is elapsed viewing time, $VT_R$ is remaining viewing time, and $PT_R$ is remaining program time:

1) $PD - TS = PT_R$

2) $VTW - VT_E = VT_R$

3) If $PT_R \geq VT_R$, then deactivate pause and rewind

4) If $PT_R < VT_R$, then activate pause and rewind

The multiplier M determines the duration of the viewing time window VTW relative to the program duration PD, i.e., PD×M=VTW. The value of multiplier M depends largely on the individual needs and resources of a service provider, including, for example, the capacity of video server 106, the size of distribution network 102, the number of connected set-top boxes, the projected number of subscriber orders during a given period, and the expectations of those subscribers in terms of an appropriate viewing time window. The typical needs and resources of a service provider generally dictate a reasonable multiplier to be from roughly 1.5 to 2. However, in the preferred embodiment of the present invention, multiplier M is 1.5, such that, for example, the present invention would provide a 3 hour viewing time window for a 2 hour movie.

EXAMPLE

Figure 2:
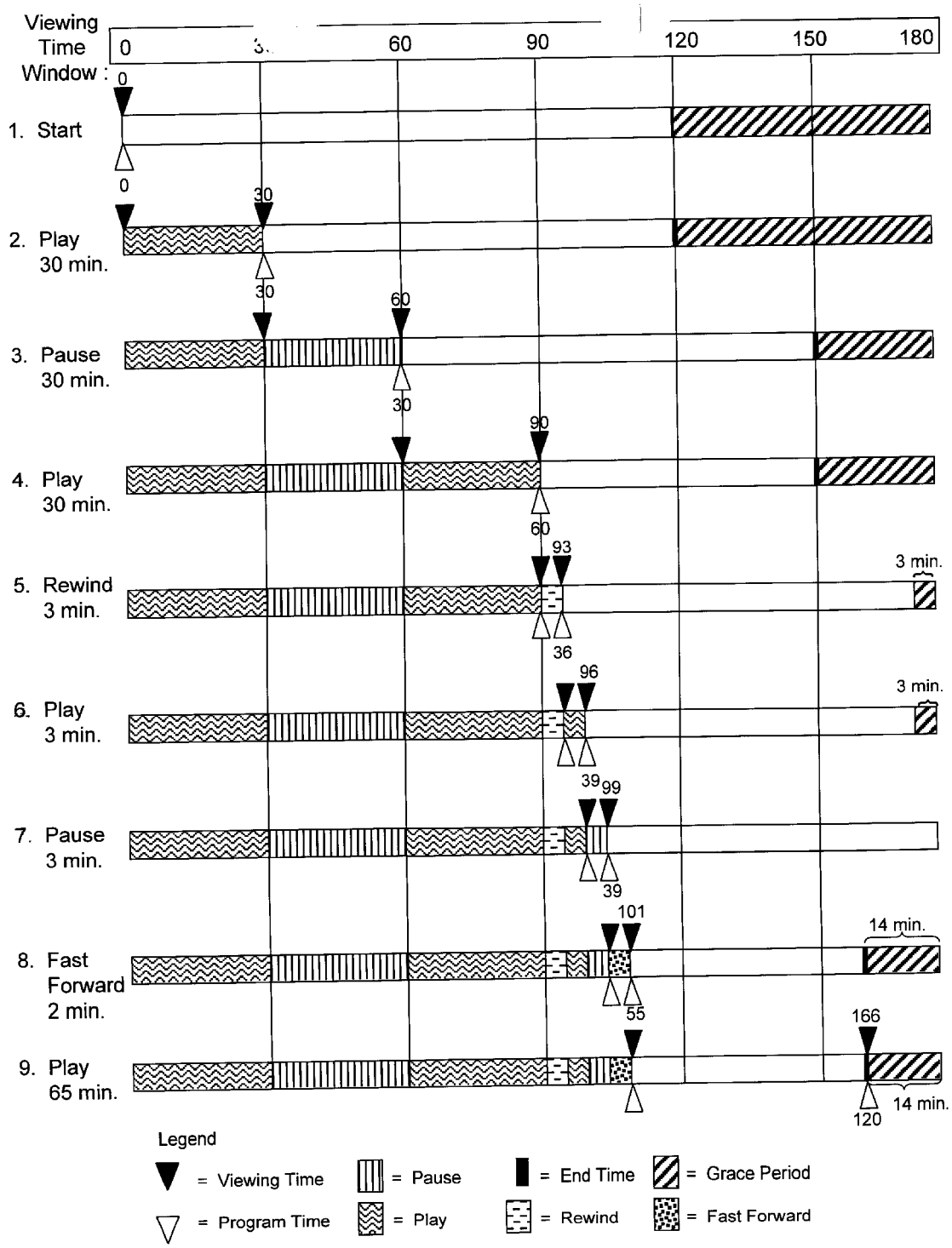
FIG. 2 is a bar diagram illustrating sequentially applied VCR commands to the playing of a 2 hour movie within a 3 hour viewing time window.

The following example illustrates how the present invention tracks the effects of VCR control and limits the VCR control through the course of a program showing. FIG. 2 traces the playing of a 2 hour movie within a 3 hour viewing time window (with the multiplier M equal to 1.5). The viewing time window is shown at the top of FIG. 2, spanning 0 to 180 minutes. Under the viewing time window, the series of bars represents sequentially applied VCR commands. On each bar, the number above the bar next to the black triangle indicates the viewing time elapsed ($VT_E$) in minutes, while the number below the bar next to the white triangle indicates the time stamp (TS) in minutes of the movie. Each patterned region of the bars represents the duration a VCR command is applied. Finally, the patterned region at the end of the bars, between the heavy vertical line (representing the end of the movie) and the end of the bar, represents the time remaining for VCR control, which this application refers to as the grace period GP. This grace period GP equals $VT_R - PT_R$.

FIG. 3 is a table in which each row corresponds to each bar shown in FIG. 2. For each bar, the table lists the elapsed viewing time $VT_E$, the remaining viewing time $VT_R$, the program location or time stamp TS, the program time remaining $PT_R$, and the grace period GP.

While the example described herein and illustrated in the figures contains many specific media flow steps, these steps should not be construed as limitations on the scope of the invention, but rather as examples of media flow steps that could be used to practice the invention. As would be apparent to one of ordinary skill in the art, many other variations on the system operation are possible, including differently grouped and ordered method steps. Further, although the following example describes the time stamp method for tracking the remaining program time, one skilled in the art would understand that the end time method could be used instead, where appropriate. Accordingly, the scope of the invention should be determined not by the embodiments illustrated, but by the appended claims and their equivalents.

Referring to FIGS. 2 and 3, step 1 represents the point immediately after ordering of the movie, when the elapsed viewing time $VT_E$ and time stamp TS are equal to zero and the grace period is equal to 60 minutes. In step 2, the movie plays uninterrupted for 30 minutes, therefore having no effect on the grace period GP. At the end of step 2, both the elapsed viewing time $VT_E$ and time stamp TS are equal to 30 minutes. In addition, the algorithm yields $VT_R = VTW - VT_E = 180 - 30 = 150$; $PT_R = PD - TS = 120 - 30 = 90$; and $GP = VT_R - PT_R = 150 - 90 = 60$, where because $PT_R < VT_R$, the pause and rewind features are activated.

In step 3, the subscriber presses the pause feature for 30 minutes. During this period, the time stamp TS remains fixed at 30 minutes, while the elapsed viewing time $VT_E$ continues to 60 minutes. Because the time stamp TS did not progress, the subscriber consumed 30 minutes of the original 60 minutes of grace period GP during this pause period, leaving a grace period GP of 30 minutes. In reference to the algorithm, $VT_R = VTW - VT_E = 180 - 60 = 120$; $PT_R = PD - TS = 120 - 30 = 90$; and $GP = VT_R - PT_R = 120 - 90 = 30$. Although the grace period GP is reduced to 30 minutes, the remaining viewing time $VT_R$ is still greater than the remaining program time, leaving the pause and rewind controls activated.

In step 4, the subscriber releases the pause feature and watches the next 30 minutes of the program uninterrupted. At the end of this period, the grace period GP remains unchanged at 30 minutes, the elapsed viewing time is 90 minutes, and the time stamp has advanced 30 minutes to 60 minutes. At this point, the algorithm calculates $VT_R = VTW - VT_E = 180 - 90 = 90$; $PT_R = PD - TS = 120 - 60 = 60$; and $GP = VT_R - PT_R = 90 - 60 = 30$, where because $PT_R < VT_R$, the pause and rewind features are still activated.

In step 5, the subscriber now decides to return to a scene in the movie that occurred just after the 30 minute pause, e.g., to retrieve a bit of information critical to the plot. The subscriber therefore holds the rewind button down for 3 minutes and returns to a previous point in the movie. Assuming the customary 1:8 ratio of rewind time to program time, 3 minutes of rewind backs up the time stamp TS of the program 24 minutes, from 60 to 36. In addition, the subscriber spent 3 minutes of viewing time to rewind to the previous scene, thereby advancing the elapsed viewing time $VT_E$ from 90 to 93 minutes. Therefore, the 24 minutes and 3 minutes are subtracted from the previous 30 minutes of grace period GP to yield a new, reduced grace period GP of 3 minutes. In terms of the algorithm, $VT_R = VTW - VT_E = 180 - 93 = 87$; $PT_R = PD - TS = 120 - 36 = 84$; and $GP = VT_R - PT_R = 87 - 84 = 3$, where because $PT_R < VT_R$, the pause and rewind features are still activated.

In step 6, the subscriber releases the rewind button, plays the scene for 3 minutes, and views the missed plot information. Because the VCR control is not applied during this period, the remaining viewing time $VT_R$ and remaining program time $PT_R$ advance concurrently and the grace period GP stays at 3 minutes. The algorithm yields $VT_R = VTW - VT_E = 180 - 96 = 84$; $PT_R = PD - TS = 120 - 39 = 81$; and $GP = VT_R - PT_R = 84 - 81 = 3$, where because $PT_R < VT_R$, the pause and rewind features are still activated.

In step 7, the subscriber pauses the program again for a short interruption, e.g., to answer a telephone call. During this pause period, because the elapsed viewing time $VT_E$ continues and the time stamp TS is fixed, the time that the program is paused is continually subtracted from the grace period GP of 3 minutes. Once paused for 3 minutes, the remaining program time $PT_R$ equals the remaining view time $VT_R$, the grace period GP equals zero, and the navigator deactivates the pause (and rewind) function(s). Thus, whether or not the subscriber is watching the program and releases the pause at 3 minutes, the navigator cancels the pause function and plays the program. At the end of this 3 minute pause period, the algorithm shows $VT_R = VTW - VT_E = 180 - 99 = 81$; $PT_R = PD - TS = 120 - 39 = 81$; and $GP = VT_R - PT_R = 81 - 81 = 0$, where because $PT_R > VT_R$, the pause and rewind features are deactivated.

Although the navigator would have deactivated the pause feature after 3 minutes, in step 8 the subscriber returns right at the 3 minute mark, releases the pause, and immediately fast-forwards to resume watching the movie near the point at which she first began rewinding to retrieve the plot information. The subscriber holds the fast-forward for 2 minutes and advances 16 minutes in program time (based on a 1:8 fast-forward ratio, i.e., 2×8=16) to resume watching at the 55 minute time stamp TS. Advancing 16 minutes in time stamp, yet taking 2 minutes of viewing time to do so, yields a net gain in grace period GP of 14 minutes. Correspondingly, the algorithm shows $VT_R=VTW-VT_E=180-101=79$; $PT_R=PD-TS=120-55=65$; and $GP=VT_R-PT_R=79-65=14$. At this point, because $PT_R<VT_R$ again, the navigator reactivates the pause and rewind features.

Finally, in step 9, after fast-forwarding the movie, the subscriber plays the remaining 65 minutes of the movie without pressing another VCR control feature. With elapsed viewing time $VT_E$ and the time stamp TS advancing concurrently, the grace period GP remains at 14 minutes up to the end of the movie. Once the movie is over, the grace period GP counts down with the remaining viewing time $VT_R$, until the end of the viewing time window VTW is reached. During this 14 minute period, the subscriber can further press the VCR control, e.g., rewind, subject to the limits of the algorithm. At the end of step 9, the algorithm yields $VT_R=VTW-VT_E=180-166=14$; $PT_R=PD-TS=120-120=0$; and $GP=VT_R-PT_R=14-0=14$, where because $PT_R<VT_R$, the pause and rewind features are still activated.

In the preferred embodiment of the present invention, after step 9, when the subscriber has watched the movie to completion and a grace period GP of 14 minutes remains, the present invention permits the subscriber to use up the remaining grace period GP by rewinding and fast-forwarding as much as desired within that 14 minutes. However, the present invention would no longer ensure that the end of the program would be reached. Thus, after watching the program the present invention would display a message saying that the subscriber can rewind or fast-forward without restriction within the remaining grace period GP, but also warning that the subscriber may not be able to watch the program through to completion after executing such rewinding and fast-forwarding. Thus, after step 9, at the end of the movie, if the subscriber wanted to replay a short scene from the beginning of the movie, and the subscriber could rewind 40 minutes of program time, watch the 1 minute scene, and return to the end of the movie within the 14 minutes of remaining grace period GP.

Alternate Embodiments

In an alternate embodiment of the present invention, the video server delivers a program to the subscriber containing at least two video portions. The video server orders and assembles the video portions into a playlist. For example, if the subscriber orders a movie, the present invention may precede the movie with an advertisement, a movie trailer, or a public announcement. With distinct portions, the present invention can apply different VCR control to each portion. For example, during an advertisement video clip, the present invention may provide rewind and pause, but not fast-forward to guarantee viewing for the advertisers. In addition, the present invention may choose to include the duration of the preceding clips in the calculation of the viewing time window or exclude them to be more fair to the subscriber.

In any case, whether to provide full VCR control during preceding video clips or to include the duration of the preceding clips in the viewing time window depends largely on the individual needs and resources of the service provider.

In a further alternate embodiment, in addition to the pause, rewind, and fast-forward functions, the present invention also supports a stop function and a scene jump function. The stop function performs identically to the pause function, except that the screen is blanked instead of frozen. In conjunction with the stop function, the present invention also allows a subscriber to re-start the movie if enough time remains in the viewing time window (which would essentially be identical to the rewind function). The scene jump function provides a menu of scenes from which to choose, similar to digital video disc formats. After a scene is chosen, the present invention jumps to that scene and plays it. The scene jump function operates like the rewind and fast-forward functions, except that the amount of time the subscriber views the menu is also added to the program end time, as if the subscriber pressed pause while viewing the menu.

Alternate Feature

In the preferred embodiment of the present invention, the navigator not only governs the VCR control but also displays the status of available VCR control. Using graphics overlaid on the program video, the navigator provides visual indicators for viewing time remaining, program time remaining, and grace period.

In addition, the navigator issues visual messages (text or icons) that warn the subscriber when the limits of VCR control are approaching, e.g., "Please note that you may only pause the program for another 10 minutes," and when pause and rewind are deactivated, e.g., "Sorry, to view the full program within the allotted time, you may no longer rewind or pause." Specifically, the navigator displays the following types of information: 1) alerts the subscriber when rewind and pause are deactivated; 2) alerts the subscriber when rewind and pause are reactivated; 3) warns the subscriber a designated time before rewind and pause time expire; 4) provides a visual indication of the remaining pause and rewind time; and 5) provides a visual indication of the time remaining in the viewing window.

The display can be any number of graphical overlays, depending on the particular network resources, e.g., graphical user interfaces, of a service provider. The display can be a pop-up window listing the relevant time information or perhaps a small bar graph, similar to the bars illustrated in FIG. 2, that is continually displayed in the corner of the screen. For the bar graph, as the subscriber watches the program and presses VCR commands, the program time bar shifts within the viewing time window and shows the current remaining grace period. If the program time bar shifts all the way to the right, the subscriber recognizes that there is no grace period and that pause and rewind are accordingly deactivated.

Alternatively, the display could be a graphical bar chart indicating the amount of rewind and pause time remaining. As each VCR control function is activated, the bar chart would change to indicate the time remaining.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for providing video cassette recorder control of an interactive media system comprising:
   (a) establishing a viewing time window during which a program must be watched;
   (b) playing the program and providing a pause function and a rewind function;
   (c) calculating a remaining viewing time of the viewing time window and a remaining program time of the program;
   (d) activating the pause function and the rewind function if the remaining program time is less than the remaining viewing time; and
   (e) deactivating the pause function and the rewind function if the remaining program time is equal to or greater than the remaining viewing time.

2. The method of claim 1, wherein establishing the viewing time window comprises multiplying a duration of the program by a multiplier.

3. The method of claim 2, wherein the multiplier is approximately 1.5 to 2.

4. The method of claim 1, wherein calculating the remaining viewing time comprises:
   (i) counting an elapsed viewing time; and
   (ii) subtracting the elapsed viewing time from the viewing time window.

5. The method of claim 1, wherein calculating the remaining program time comprises:
   (i) receiving a duration of the program;
   (ii) receiving a time stamp encoded in the program; and
   (iii) subtracting the time stamp from the program duration.

6. The method of claim 1, wherein calculating the remaining program time comprises:
   (i) receiving a duration of the program;
   (ii) calculating an original program end time;
   (iii) if the pause function is activated for a pause duration, adding the pause duration to the original program end time; and
   (iv) if the rewind function is activated for a rewind duration, which shifts the program back a rewound program time, adding the rewind duration and the rewound program time to the original program end time.

7. The method of claim 6, further comprising:
   (v) providing a fast-forward function; and
   (vi) if the fast-forward function is activated for a fast-forward duration, which shifts the program forward a fast-forward program time, subtracting the fast-forward program time from and adding the fast-forward duration to the original program end time.

8. The method of claim 7, wherein the rewound program time and the fast-forwarded program time are a proportion of the rewind duration and the fast-forward duration, respectively.

9. The method of claim 1, further comprising:
   (f) calculating a grace period; and
   (g) displaying a status summarizing the remaining viewing time, the remaining program time, and the grace period.

10. The method of claim 9, wherein calculating the grace period comprises subtracting the remaining program time from the remaining viewing time.

11. The method of claim 9, wherein displaying a status comprises overlaying a graphic on the program.

12. The method of claim 1, further comprising:
    (f) calculating a remaining pause and rewind function time; and
    (g) displaying a status summarizing the remaining viewing time, the remaining program time, and the remaining pause and rewind function time.

13. The method of claim 1, wherein the program comprises a first portion and a second portion, and wherein the viewing time window is calculated based on the second portion only.

14. The method of claim 1, wherein the program comprises a first portion and a second portion and wherein the pause function and the rewind function are only provided during the second portion.

15. An interactive media system that provides video cassette recorder control comprising:
    (a) a video server that transmits a program;
    (b) a program information database that stores a duration of the program; and
    (c) at least one processing device in communication with the video server, wherein the at least one processing device calculates a viewing time window within which to transmit the program, calculates a remaining viewing time of the viewing time window, calculates a remaining program time of the program, and provides a pause function and a rewind function when the remaining viewing time is greater than the remaining program time.

16. The system of claim 15, further comprising a program database in which the program is stored, said program database being in communication with the video server.

17. The system of claim 15, further comprising an input device, in communication with the at least one processing device, for activating the pause function and the rewind function.

18. The system of claim 15, wherein the at least one processing device-provides a fast-forward function, a stop function, and a scene jump function.

19. The system of claim 15, wherein the at least one processing device comprises an operating system, a navigator provisioned on the operating system, and a memory storage.

20. The system of claim 15, further comprising a distribution network over which the video server communicates with the at least one processing device.

21. The system of claim 15, further comprising a connection management system in communication with the video server and the at least one processing device.

22. A method for limiting interactive media video cassette recorder (VCR) control to a fixed duration comprising deactivating VCR functions that increase program duration when a remaining program duration equals or exceeds a remaining fixed duration.

23. The method of claim 22, further comprising activating the VCR functions that increase program duration when the remaining program duration is less than the remaining fixed duration.

24. A set-top box that provides interactive media video cassette recorder (VCR) control limited to a fixed duration, comprising:
    (a) a receiver that receives a program, a program duration, and a program time stamp from a head end;
    (b) a transmitter that sends VCR functions to the head end; and
    (c) an application that counts elapsed viewing time, subtracts the elapsed viewing time from the fixed duration to determine a remaining viewing time, subtracts the program time stamp from the program duration to determine a remaining program duration, and stops the transmitter from sending the VCR functions when the remaining program duration equals or exceeds the remaining viewing time.

* * * * *